United States Patent
Green, Sr. et al.

(10) Patent No.: US 8,165,520 B2
(45) Date of Patent: *Apr. 24, 2012

(54) SATELLITE BROADCAST RECEIVING AND DISTRIBUTION SYSTEM

(75) Inventors: James A. Green, Sr., Tallahassee, FL (US); Austin S. Coker, Jr., Tallahassee, FL (US)

(73) Assignee: Global Communications, Inc., Tallahassee, FL (US)

( * ) Notice: Subject to any disclaimer, the term of this patent is extended or adjusted under 35 U.S.C. 154(b) by 429 days.

This patent is subject to a terminal disclaimer.

(21) Appl. No.: 12/464,969

(22) Filed: May 13, 2009

(65) Prior Publication Data

US 2010/0122301 A1    May 13, 2010

Related U.S. Application Data

(63) Continuation of application No. 11/089,131, filed on Mar. 24, 2005, now Pat. No. 7,542,717, which is a continuation of application No. 10/016,119, filed on Dec. 17, 2001, now Pat. No. 6,917,783, which is a continuation of application No. 09/621,464, filed on Jul. 21, 2000, now Pat. No. 6,334,045, which is a continuation of application No. 09/001,484, filed on Dec. 31, 1997, now Pat. No. 6,122,482, which is a continuation of application No. 08/838,677, filed on Apr. 9, 1997, now Pat. No. 5,805,975, which is a continuation of application No. 08/394,234, filed on Feb. 22, 1995, now abandoned.

(51) Int. Cl.
*H04H 20/74* (2008.01)
*H04B 7/185* (2006.01)

(52) U.S. Cl. ..... 455/3.02; 455/12.1; 725/63; 348/E7.05; 348/E7.093

(58) Field of Classification Search ................. 455/3.01, 455/3.02, 3.03, 3.04, 12.1, 14, 20, 22, 179.1, 455/427, 428; 348/E7.04, E7.093; 725/63, 725/67, 68
See application file for complete search history.

(56) References Cited

U.S. PATENT DOCUMENTS 3,324,417 A    6/1967    Garner
(Continued)

FOREIGN PATENT DOCUMENTS

CN    67200    12/1992
(Continued)

OTHER PUBLICATIONS

File History Control No. 95/000,293, Inter Partes Reexamination of U.S. Patent No. 6,947,702.

(Continued)

*Primary Examiner* — Quochien B Vuong
(74) *Attorney, Agent, or Firm* — Nixon & Vanderhye P.C.

(57) ABSTRACT

The present invention provides for a satellite system that will permit for the transmission of signals of two different frequencies and polarities to be transmitted simultaneously, also the system will accommodate two different polarity commands from two or more different sources at the same time. The satellite system of the present invention includes a satellite dish or antenna that receive signals. These received signals are then transmitted to a converter. A head-in frequency processor is coupled to the converter. This head-in frequency processor enables the different frequencies and polarities to be transmitted simultaneously via a single coaxial cable. This single coaxial cable is coupled to a head-out receiver processor which is connected to a receiver. This receiver is connected to a source. This unique design and configuration provides for the system that will permit for satellite broadcasting to occur in locations that are not in the line-of-sight path to the satellites. Accordingly, the satellite system of the present invention will permit satellite broadcasting in high-rises, hospitals, condominiums, schools, and the like.

37 Claims, 1 Drawing Sheet

U.S. PATENT DOCUMENTS

| | | |
|---|---|---|
| 3,665,316 A | 5/1972 | Jeffers |
| 3,730,980 A | 5/1973 | Kirk, Jr. |
| 3,936,594 A | 2/1976 | Schubin et al. |
| 4,023,104 A | 5/1977 | Rheinfelder |
| 4,066,966 A | 1/1978 | Takeuchi et al. |
| 4,130,801 A | 12/1978 | Prygoff |
| 4,135,202 A | 1/1979 | Culter |
| 4,183,054 A | 1/1980 | Patisaul et al. |
| 4,395,734 A | 7/1983 | Rypkema |
| 4,419,768 A | 12/1983 | Yamashita et al. |
| 4,429,418 A | 1/1984 | Hooper |
| 4,439,740 A | 3/1984 | Harrington |
| 4,484,218 A | 11/1984 | Boland et al. |
| 4,486,773 A | 12/1984 | Okubo |
| 4,509,198 A | 4/1985 | Nagatomi |
| 4,512,033 A | 4/1985 | Schrock |
| 4,513,315 A | 4/1985 | Dekker et al. |
| 4,527,136 A | 7/1985 | Kamiya |
| 4,530,008 A | 7/1985 | McVoy |
| 4,532,543 A | 7/1985 | Groenewegen |
| 4,538,174 A | 8/1985 | Gargini et al. |
| 4,538,175 A | 8/1985 | Balbes et al. |
| 4,542,300 A | 9/1985 | Nagatomi |
| 4,545,048 A | 10/1985 | Hauk et al. |
| 4,545,075 A | 10/1985 | Miller et al. |
| 4,556,988 A | 12/1985 | Yoshisato |
| 4,558,358 A | 12/1985 | Onda |
| 4,580,161 A | 4/1986 | Petrus et al. |
| 4,586,081 A | 4/1986 | St. Arnaud et al. |
| 4,592,093 A | 5/1986 | Ouchi et al. |
| 4,596,047 A | 6/1986 | Watanabe et al. |
| 4,605,968 A | 8/1986 | Hayashi |
| 4,608,710 A | 8/1986 | Sugiura |
| 4,616,108 A | 10/1986 | Yamaguchi et al. |
| 4,648,123 A | 3/1987 | Schrock |
| 4,667,243 A | 5/1987 | Blatter et al. |
| 4,677,686 A | 6/1987 | Hustig et al. |
| 4,709,418 A | 11/1987 | Fox et al. |
| 4,710,777 A | 12/1987 | Halverson |
| 4,710,972 A | 12/1987 | Hayashi et al. |
| 4,739,510 A | 4/1988 | Jeffers et al. |
| 4,761,825 A | 8/1988 | Ma |
| 4,761,827 A | 8/1988 | Horton et al. |
| 4,866,787 A | 9/1989 | Olesen |
| 4,901,367 A | 2/1990 | Nicholson |
| 4,959,862 A | 9/1990 | Davidov et al. |
| 4,979,230 A | 12/1990 | Marz |
| 4,993,066 A | 2/1991 | Jenkins |
| 5,045,823 A | 9/1991 | Nichols, III |
| 5,073,930 A | 12/1991 | Green et al. |
| 5,136,411 A | 8/1992 | Paik et al. |
| 5,181,106 A | 1/1993 | Sutherland |
| 5,204,767 A | 4/1993 | Nakata et al. |
| 5,206,954 A | 4/1993 | Inoue et al. |
| 5,216,432 A | 6/1993 | West |
| 5,221,983 A | 6/1993 | Wagner |
| 5,225,799 A | 7/1993 | West et al. |
| 5,276,904 A | 1/1994 | Mutzig et al. |
| 5,301,352 A | 4/1994 | Nakagawa et al. |
| 5,303,229 A | 4/1994 | Withers et al. |
| 5,303,403 A | 4/1994 | Leong |
| 5,331,332 A | 7/1994 | West et al. |
| 5,345,591 A | 9/1994 | Tsurumaki et al. |
| 5,437,051 A | 7/1995 | Oto |
| 5,440,319 A | 8/1995 | Raymond et al. |
| 5,455,961 A | 10/1995 | Nakagawa |
| 5,457,811 A | 10/1995 | Lemson |
| 5,463,407 A | 10/1995 | West et al. |
| 5,481,542 A | 1/1996 | Logston et al. |
| 5,488,413 A | 1/1996 | Elder et al. |
| 5,488,659 A | 1/1996 | Miliani |
| 5,504,609 A | 4/1996 | Alexander et al. |
| 5,541,757 A | 7/1996 | Fuse et al. |
| 5,572,347 A | 11/1996 | Burton et al. |
| 5,574,964 A | 11/1996 | Hamlin |
| 5,592,540 A | 1/1997 | Beveridge |
| 5,630,226 A | 5/1997 | Kanda et al. |
| 5,644,368 A | 7/1997 | Natsume |
| 5,657,143 A | 8/1997 | Hajj et al. |
| 5,659,351 A | 8/1997 | Huber |
| 5,666,126 A | 9/1997 | Lange |
| 5,682,426 A | 10/1997 | Miliani et al. |
| 5,737,698 A | 4/1998 | Gabrelian et al. |
| 5,752,180 A | 5/1998 | Guo et al. .......................... 455/3 |
| 5,787,335 A | 7/1998 | Novak |
| 5,793,258 A | 8/1998 | Lange |
| 5,805,975 A | 9/1998 | Green, Sr. et al. |
| 5,812,591 A | 9/1998 | Shumaker et al. |
| 5,812,947 A | 9/1998 | Dent |
| 5,835,128 A | 11/1998 | Macdonald et al. |
| 5,889,498 A | 3/1999 | Lange et al. |
| 5,898,455 A | 4/1999 | Barakat et al. |
| 5,926,744 A * | 7/1999 | Fukuzawa et al. .............. 725/68 |
| 5,933,123 A | 8/1999 | Kaul |
| D414,187 S | 9/1999 | Lange et al. |
| 5,959,592 A | 9/1999 | Petruzzelli |
| 5,970,386 A | 10/1999 | Williams |
| 5,995,258 A | 11/1999 | Weber et al. |
| 6,104,908 A | 8/2000 | Schaffner et al. |
| 6,122,482 A | 9/2000 | Green, Sr. et al. |
| 6,134,419 A | 10/2000 | Williams |
| 6,334,045 B1 | 12/2001 | Green, Sr. et al. |
| 6,397,038 B1 | 5/2002 | Green, Sr. et al. |
| 6,486,907 B1 | 11/2002 | Farber et al. |
| 6,947,702 B2 | 9/2005 | Green, Sr. et al. |
| 2003/0040270 A1 | 2/2003 | Green et al. |

FOREIGN PATENT DOCUMENTS

| | | |
|---|---|---|
| DE | 3623581 | 4/1988 |
| DE | 4117208 A1 | 11/1992 |
| DE | 41 26 774 | 1/1993 |
| DE | 41 28 947 A1 | 3/1993 |
| DE | 43 34 440 A1 | 4/1995 |
| DE | 4334440 | 4/1995 |
| DE | G93 06 499.3 | 5/2010 |
| EP | 0421708 A2 | 4/1991 |
| FR | 2642598 A1 | 7/1991 |
| GB | 2119192 | 11/1983 |
| GB | 2137843 | 10/1984 |
| JP | 2-140022 | 11/1988 |
| JP | 63309032 | 12/1988 |
| JP | 2-140022 | 5/1990 |
| JP | H4-189036 | 7/1992 |
| JP | 196279 | 11/1992 |
| JP | H05-315989 | 11/1993 |
| JP | 5-344014 | 12/1993 |

OTHER PUBLICATIONS

Defendants' First Supplemental Response to Plaintiff Global Communications Inc.'s First Set of Interrogatories (Interrogatory No. 16) (4:09-CV-00200-RS-WCS), Sep. 25, 2009.

Defendants' First Supplemenal [sic; Supplemental] Response to Plaintiff Global Communications Inc.'s Interrogatory Nos. 2, 6, and 15, and Amended Supplemental Response to Interrogatory No. 16 (4:09-CV-00200-RS-WCS) Oct. 2, 2009.

Docket for *Global Communications, Inc.* v. *Dish Network Corp.*, ND Fla. (4:09-CV-00200-RS-WCS) [Case closed], Jan. 22, 2010.

Docket for *Global Communications* v. *Echostar*, No. 2:07-CV-00119-TJW-CE (E.D. Tex.) [Case closed], Feb. 21, 2010.

Long, Mark E., "The Digital Satellite TV Handbook," Newnes Publications (1999).

"Broadband Communication Agile Processor 362HL," cadco Inc., 1990 Catalog, 6 pages.

"Private Cable Update" Dec. 1997.

"Announcing Heifner Communications' DBS Transport with DirecTV," Private Cable Update (Sep. 1997).

"Bridging the DBS Market," Private Cable Investor, No. 198 (Nov. 30, 1996).

"DBS Transport," "Heifner Communications, Inc. in cooperation with World Satellite Network (WSNet), announces the first availability of DBS transport to the Private Cable Market," with DBS Survey (Aug. 11, 1997 fax).

"DirecTV, Inc. Launches MDU Program," Retailer News (Sep. 2-8, 1996).

"DirecTV, Inc. Launches Program to Serve Multiple-Family Dwelling Unit Market" (Aug. 8, 1996).
"Heifner Communications completes installation of first fiber optic deliverd L-band system in the U.S.," Private Cable Update (Dec. 1997).
"Special Advertising Section, 1997 Buyer's Guide," Private Cable & Wireless Cable, p. A19, A16 (Jan. 1997).
"The report on the development of the most effective solution yet developed to distribute digital satellite signals in large properties," Presented jointly by; Heifner Communications, Inc., Foxcom, Ltd., Global Communications, Inc. (Mar. 1997).
"Untangling the MDU/DBS Universe," Private Cable Investor (Apr. 30, 1997).
Nov. 11, 1996 letter (with attachment).
Dec. 10, 1996 letter (with attachment).
May 24, 1996 letter (with attachments) from Williams to Coker.
Jun. 12, 1996 letter from Coker to Williams.
Advertisement, "Don't cut corners on your installation," ChannelPlus, TVRO Dealer (May 1997).
Advertisement, CommScope, Inc. Network Cable Division, TVRO Dealer (Sep. 1994).
Allon, Mor, "Delivering the Satellite Goods," and WSNet Advertisement, "It is a small world, after all.," Private Cable & Wireless Cable, vol. 16, No. 11 (Nov. 1997).
Baylin, "Digital Satellite TV" (5th Ed. 1997), pp. 92-93 and 159-163.
Baylin, Frank, et al., *World Satellite TV and Scrambling Methods*, third edition, 1993, Baylin Publications, Boulder, CO, pp. 7-14.
Brucke zum Kunden, Neue UKW-Kanalumsetzer ubertragen viele Programme in bester Stereo-Qualitat fur grosse Germeinschafts-Antennenanlagen, Eckar Germany (1973).
Cooper, "How to Build a Satellite TV Receiver," Radio Electronics (1981).
Dinsel, "Die Verteilung von Fernseh-Satelliten-Signalen in Kabelnetzen," Fernseh-Und Kino-Technik, vol. 39, No. 1, Berlin, Germany, (Jan. 1985).
Douville, "A 12-GHZ Low-Cost Earth Terminal for Direct TV Reception from Broadcast Satellites", IEEE Proceedings on Consumer Electronics (1977).
Draty, David, "SDTV" A Cost-Effective Solution for MDUs, The Transponder (May 1997).
Foxcom Advertisement, "Connect . . . with Fiber"(1997).
Foxcom, "About Us," 2 pages (.Copyrgt.1997-1999).
Global Communications, Inc. ".Announcing, DBS Digi-SMATV™ Clearly the Best Value in Mini-Cable Systems" (1996).
Global Communications, Inc. "News.Flash, DBS Digi-SMATV™ Clearly the Best Value in Mini-Cable Systems" (1996).
Global Communications, Inc. Apr. 19, 1995 letter to Eddy Hartenstein.
Grant, "Direct Broadcast from Lower Power Satellites," 81 Proceedings of the IEEE International Conf. on Comm., pp. 26.1.1-16.1.5, (Jun. 1981).
Heifner Communications Oct. 18, 1996 fax to Global Communications.
Heifner Communications, Inc. "Proposal to Incorporate Traditional and L-Band Distribution" (Aug. 11, 1996).
Heifner Communications, Inc., "Private Cable Industry Gets Fiber Optic Solution to DBS Delivery!" (Mar. 13, 1997).
Hogan, Monica, "If you Can't Beat 'em, Join 'em," Satellite Retailer (May 1995).
International Cable, SkyPix, "Changing the way you watch television . . . forever.", Specifications, SkyPix 36" Antenna, Lockwood, L.W., "DirecTV—A digital DBS" (Apr. 1993).
Jurgen, "Chasing Japan in the HDTV Race," IEEE Spectrum, No. 10, pp. 26-30 (Oct. 1989).

Konishi, et al., "Satellite Broadcasting," 89 SMPTE Journal, No. 3, pp. 162-166 (Mar. 1980), First Printed Dec. 1978.
MDU Technical Specification, Multi-user Systems Specifications, Revision 1.0, DirectTV (Jan. 20, 1997).
Moore, Ivan, "Competition, You are the Gatekeeper and Planning Is the Key" (Nov./Dec. 1995).
Moore, Ivan, "Digital Dwellings," Private Cable & Wireless Cable, vol. 16, No. 10 (Oct. 1997).
Multi-user Systems Specifications, DSS-MDU Single 1000 Open Specification, Rev. 1.0, Preliminary (Jan. 17, 1997).
Mussino, "Reception and Distribution Techniques for DBS Signals in Community Antenna Installations," Alta Frequenza, vol. 55, No. 2, Milano Italy (Apr. 1986).
Mussino, Franco, Verified translation of "The Reception of Direct Broadcast Satellite TV Signals in the 12 GHz Band, Using the 'C-Mac Packet System'," Electronics and Telecommunications No. 3 (1984).
Press Release, Heifner Communications Inc. (Oct. 15, 1996).
Private Cable & Wireless Cable, "DBS and PCOs: An Evolving Relationship" (Aug. 1996).
Private Cable & Wireless Cable, vol. 16, No. 9, 3 pages (Sep. 1997).
Private Cable Investor, No. 179 (Apr. 30, 1995).
Product Review, Satellite Retailer/Aug. 1992.
RCN Oct. 4, 1996 letter (with attachment).
Retailer News, Supplement to Triple D Publishing, Inc. Publications Issue 19 (May 6-12, 1996).
Shrader, Robert L., Electronic Communication, Fifth Edition, p. 398.
Slater, Heidi, K., "Satellite Showcase, SBCA's Vegas '97 searches to overcome the industry's critical challenges," Private Cable & Wireless Cable, p. 31 (May 1997).
Tannas Jr., "HDTV Displays in Japan: Projection-CRT Systems on Top," IEEE Spectrum, 0018-9235/89/1000-0031, pp. 31-33 (Oct. 1989).
U.S. Appl. No. 60/068,589, filed Dec. 23, 1997.
USSB Research Findings, Source: Frank N. Magid Associates, "Households with DSS Connected to Stereo or Surround Sound System, VCR Ownership" (May 1, 1996).
White Papers, "SDTV Satellite Distribution Television System for Multiple Dwelling Units," www.foxcom.com, 6 pages (Copyright 1997-1999).
WSNet Annual Shareholder Report for the Fiscal Year Ended Aug. 31, 1997.
Martin, Ernesto R., "DBS systems, Perspectives from a profit seeking company" Telecommunications Policy, pp. 291-300 (Dec. 1985).
Hsiung, James C., "C-band DBS, An analysis of the US scrambling issue," Telecommunications Policy, pp. 77-86 (Mar. 1988).
K. Jungk, "Wellencocktail in der Hausanlage," Funkschau, Aug. 24, 1990 (with translation).
L. Ulsamer, "Eine Schussel fur viele Familien," Funkschau, Aug. 23, 1991 (with translation).
Tri T. Ha, "Digital Satellite Communications," Second Edition, pp. 25-28.
Microelectronics Technology Inc., "All Solutions for SAT-TV/SMATV/VSAT," 1 page (Jul. 1993).
Microelectronics Technology Inc., "GP5/GP51/ GP52, Telecom LNBF Series," 2 pages (Aug. 1993).
Microelectronics Technology Inc., "GP6/GP62/GP62VH/GP31ABC, Astra LNBF Series," Aug. 1993.
Global Communications (UK) Ltd. CCOM marketing material, published on or before Oct. 19, 1993.
USPTO File History of Reexamination Control No. 95/000,293.
Third Party Request for Ex Parte Reexamination of patent No. 6,122,482 filed in the USPTO on Feb. 3, 2012.

* cited by examiner

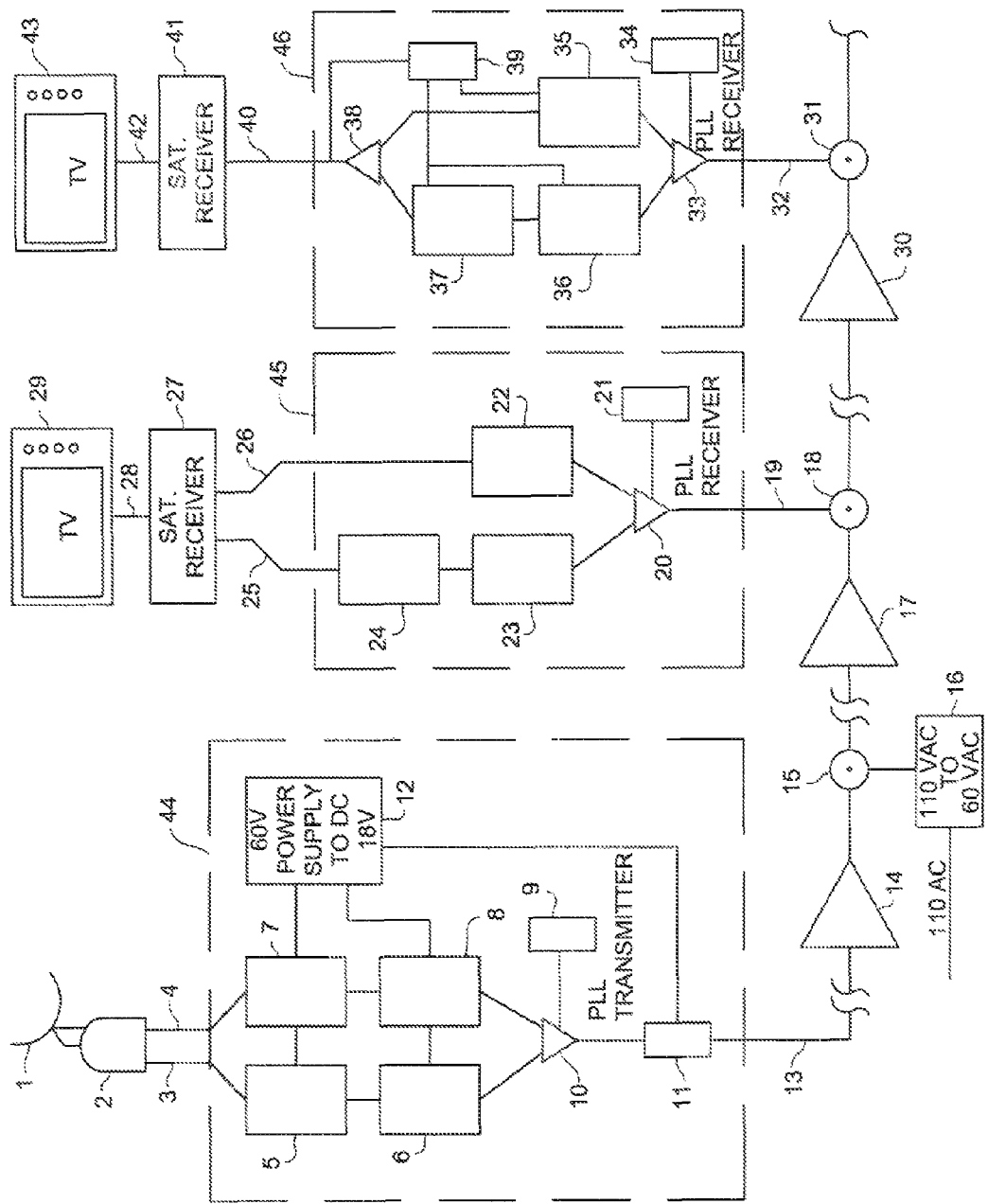

SATELLITE BROADCAST RECEIVING AND DISTRIBUTION SYSTEM

CROSS-REFERENCES TO RELATED APPLICATIONS

This application is a continuation of application Ser. No. 11/089,131 filed Mar. 24, 2005, now U.S. Pat. No. 7,542,717; which is a continuation of application Ser. No. 10/016,119 filed on Dec. 17, 2001, now U.S. Pat. No. 6,917,783; which is a continuation of application Ser. No. 09/621,464 filed on Jul. 21, 2000, now U.S. Pat. No. 6,334,045; which is a continuation of application Ser. No. 09/001,484 filed on Dec. 31, 1997, now U.S. Pat. No. 6,122,482; which is a continuation of application Ser. No. 08/838,677 filed on Apr. 9, 1997, now U.S. Pat. No. 5,805,975; which is a continuation of application Ser. No. 08/394,234 filed on Feb. 22, 1995, abandoned.

BACKGROUND OF THE INVENTION

1. Field of the Invention

The present invention relates generally to a satellite broadcasting receiving and distribution system and more particularly to a broadcasting receiving and distribution system that will allow for the transmission of vertical and horizontal or left-hand circular and right-hand circular polarization signals to be transmitted simultaneously via a single coaxial cable.

2. Description of the Prior Art

Satellite broadcasting has become very popular throughout the United States. Conventionally, broadcast signals are transmitted through an artificial satellite at very high frequencies. These frequencies are generally amplified and are processed by a particular device after received by an antenna or antennas and prior to application to a conventional home television set or the like.

The device is composed of an outdoor unit generally associated with the antenna and an indoor unit generally associated with the television set or the like and both units are coupled via a coaxial cable.

A problem associated with these types of systems is that they are designed to accept signals through a line of sight. Accordingly, if the satellite is not visual from a building, then the signal cannot be transmitted. Thus, these systems are rendered useless for high-rises, hospitals, school, and the like. These systems are limited in usage, and as such, can only be utilized in residential homes.

As an example, U.S. Pat. No. 5,301,352 issue to Nakagawa et al. disclose a satellite broadcast receiving system. The system of Nakagawa et al. includes a plurality of antennas which, respectively, include a plurality of output terminals. A change-over divider is connected the plurality of antennas and have a plurality of output terminals. A plurality of receivers are attached to the change-over divider for selecting one of the antenna. Though this system does achieve one of its objects by providing for a simplified satellite system, it does, however, suffer a major short coming by not providing a means of receiving satellite broadcasting for individuals who are not in direct line of sight to the antennas. This system is silent to the means of simultaneously transmitting vertical and horizontal polarized signals via a single coaxial cable.

U.S. Pat. No. 5,206,954, issue to Inoue et al. disclose yet another satellite system that includes an outdoor unit that is connected to a channel selector. In this embodiment, the satellite signal receiving apparatus receives vertically and horizontally polarized radiation signals at the side of a receiving antenna. The signals are then transmitted, selectively to provide for either one of the vertically or horizontally polarized signals to be transmitted. This design and configuration provides for one coaxial cable to be utilized, but does not provide for the vertical and horizontal signals to be transmitted simultaneously, but rather, selectively.

None of these previous efforts, however, provide the benefits intended with the present invention. Additionally, prior techniques do not suggest the present inventive combination of component elements as disclosed and claimed herein. The present invention achieves its intended purposes, objectives and advantages over the prior art device through a new, useful and unobvious combination of component elements, which is simple to use, with the utilization of a minimum number of functioning parts, at a reasonable cost to manufacture, assemble, test and by employing only readily available material.

SUMMARY OF THE INVENTION

The present invention provides a satellite broadcast receiving and distribution system that will permit for the transmission of vertical and horizontal or left-hand circular and right-hand circular polarization signals simultaneously via a single coaxial cable. The system of the present invention will accommodate two different polarity commands from two or more different sources at the same time. This satellite broadcast receiving and distribution system of the present invention will provide for the signals received from the satellite to be converted to frequencies which the present day amplifiers can transport. This will permit for the signals to travel via existing wiring in buildings, high-rises, hospitals, and the like so that satellite broadcasting can be viewed by numerous individuals by way of a single satellite antenna.

The satellite broadcast system consists of a satellite antenna which receives the polarized signals. These polarized signals are transmitted to a head-in processor and are converted to different frequencies and polarities in order to render the different signals to be transmitted simultaneously. Hence, the head-in processor will permit for the transmission of signals of two different frequencies and polarities to be transmitted simultaneously and will also accommodate two different polarity commands from two or more different sources at the same time via a single cable. This cable is coupled to a head-out processor. These signals, once in the head-out processor, will be converted to frequencies and polarities that are required for the source (i.e. television). Once converted, the signals are transmitted to a satellite receiver. This satellite receiver is coupled to the source.

Accordingly, it is the object of the present invention to provide for a satellite broadcast receiving and distribution system that will convert different frequencies and different polarized signals in order to permit the signals to be transmitted via a single coaxial cable.

It is another object of the present invention to provide for a satellite broadcast receiving and distribution system that will provide service to mid/high-rise office buildings, condominiums, schools, hospitals and the like via a single satellite.

A final object of the present invention, to be specifically enumerated herein, is to provide a satellite broadcast receiving and distribution system in accordance with the proceeding objects and which will conform to conventional forms of manufacture, be of simple construction and easy to use so as to provide a system that would be economically feasible, long lasting and relatively trouble free in operation.

Although there have been many inventions related to satellite broadcast receiving and distribution systems, none of the inventions have become sufficiently compact, low cost, reliable enough to become commonly used, and all still require the use of two cables in order to transmit the full band width signals of the different polarized frequencies simultaneously. The present invention meets the requirements of the simplified design, compact size, low initial cost, low operating cost, ease of installation and maintainability, and minimal amount of training to successfully employ the invention.

The foregoing has outlined some of the more pertinent objects of the invention. These objects should be construed to be merely illustrative of some of the more prominent features and application of the intended invention. Many other beneficial results can be obtained by applying the disclosed invention in a different manner or modifying the invention within the scope of the disclosure. Accordingly, a fuller understanding of the invention may be had by referring to the detailed description of the preferred embodiments in addition to the scope of the invention defined by the claims taken in conjunction with the accompanying drawings.

BRIEF DESCRIPTION OF THE DRAWINGS

FIG. 1 illustrates a block diagram representing the satellite broadcast signal receiving and distribution system according to the present invention.

Similar reference numerals refer to similar parts throughout the several views of the drawings.

DESCRIPTION OF THE PREFERRED EMBODIMENTS

As illustrated in FIG. 1, the satellite system of the present invention includes a receiving satellite that is connected to a head-in equipment frequency processor 44. It is at this head-in equipment frequency processor where the signals (Vertical-polarized signals and Horizontal-polarized signals or left-hand circular and right-hand circular polarization signals) are received simultaneously and then transmitted via a single coaxial cable 13 to the head-out receiver processor 45 or 46. From the receiver processor, the signals are transported to a satellite receiver 27 or 41 and to a source 29 or 43 (this FIGURE illustrates a television as its source).

As illustrated, the receiving satellite 1 is connected to a low-noise block converter (LNB) 2 for amplifying the respective polarized signals (Vertical-polarized signals and Horizontal-polarized signals or left-hand circular and right-hand circular polarization signals). This LNB is coupled to the head-in equipment frequency processor 44. Accordingly, after signals are received, they pass the low-noise block converter 2, to provide for the signals to enter the head-in equipment frequency processor 44 (illustrated in dashed lines) via conduits 3 and 4.

The head-in equipment frequency processor 44 provides for the signals via lines 3 and 4 to be converted to the frequencies which the present day amplifiers can transport via converters 5 and 7, respectively. From the conduits 3 and 4, the signals or transponders are transmitted to a first converter or down converter 5 and a second converter or up converter 7, respectfully. These frequency converters convert the entered frequencies to frequencies which the present day amplifiers can transport.

The utilization of two converters permit for the acceptance of two signals or polarized transponders that are of a different frequency.

In the down converter 5, the transponders are converted down to a specified frequency. This specified frequency is the frequency that is required for the present day amplifiers to transport. The newly converted frequencies are amplified through the amplifying means 6. At means 6, the converted frequencies are amplified so not to create second harmonics. These signals are then transferred to a four way splitter 10.

In the up converter 7, the transponders are converted up to a specified frequency. The converted frequencies then are converted down via down converter 8. This process of converting up and then down provides for frequencies to be converted without difficulties and avoiding the forbidden conversion area.

The converted signals are transferred to the four way splitter 10 in order to combine the frequency of the amplifier signal of 6 and frequency from converter 8. To synchronized the system, the frequencies from the phase lock loop (PLL) transmitter 9 are transmitted to the splitter 10.

From 10, the signals are passed through an A.C. power separator 11 which routes 60 Volts power to a D.C. power supply of 18 Volts.

This will permit for the dual frequencies from the satellite dish to be transmitted simultaneously via a single coaxial cable 13. Dependent upon the length of the cable, an optional amplifier 14 can be coupled thereto. Power from a power source 16 is inserted into the lines via a power inserter 15. The signals are amplified, as needed, with an additional amplifier 17. It is noted that the amplifiers are optional and are dependent to the distance that the head-in frequency processor 44 is located from the head-out receiver processor 45 or 46. The power supply and power source 16 energize the head-in frequency processor 44.

From the single coaxial cable 13, the signals are adjusted via a tap 18 or 31 to permit for the appropriate decibels that is required for the head-out receiver processor 45 or 46.

The head-out frequency processor includes a plurality of embodiments. The design and configuration of the head-out frequency processor is dependent on the source in combination with the satellite receiver.

The first embodiment for the head-out receiver processor is illustrated in FIG. 1 and is represented by way of dashed lines 45. As seen in this head-out receiver processor, the simultaneously transmitted signals enter the processor via conduit 19. The conduit is coupled to a four (4) way splitter 20. A phase lock loop (PLL) receiver 21 is coupled to the splitter 20 to permit for the signals to be locked to the proper and desired frequencies. From the splitter, the first frequency is transmitted to a first converter 22 in order to permit signals or transponders to be converted up to a specified frequency. This up converted signal is then transmitted to the satellite receiver 27 by way of a conduit 26.

The second frequencies are transmitted to a first or up converter 23 and then is transmitted to a second or down converter 24. This will permit for the signals to be converted to the desired frequency. The conversion of the signals from up to down provides the benefit of converting the frequencies without any mishap or error. This method of conversion will avoid the forbidden conversion area. This second or down converter 24 is coupled to the satellite receiver 27 via conduit 25. The signals received from the satellite 1 can then be transmitted to the source 29 by line 28.

As illustrated, this head-out receiver processor 45 is the reverse process of the head-in processor 44. This is to provide for the signals to reconvert to its original frequencies so as to provide for the satellite receiver and source to accept the signals. The single cable 13 accepts the signals at frequencies different than that of the source 29. Accordingly the head-out receiver processor 45 must reconvert the signals to the frequencies that are utilized by the source. This design and configuration of the head-out receiver processor is dependent on the design and configuration of the satellite.

An alteration of the satellite receiver requires an alteration in the head-out receiver processor. This alteration is illustrated in FIG. 1 and is shown in outline and designated as reference 46. In this design and configuration, the satellite receiver utilizes only one wire 40 and accepts only one type of signals, at a time, such as left-hand circular or right-hand circular polarized signals.

As seen, the frequencies are tapped via 31. The tap 31 is coupled to the head-out receiver processor 46 via line 32 which is connected to a four (4) way splitter 33. To provide for the signals to be locked in proper frequencies, the four way splitter 33 is coupled to a phase lock loop (PLL) receiver 34.

From the splitter 33, the first signal is transmitted to a first or up converter 36 and then is transmitted to a second or down converter 37. The conversion of the signals from up to down provides the benefit of converting the frequencies without any mishap or error. This method of conversion will avoid the forbidden conversion area.

The signals, from the splitter 33 are transmitted to an up converter 35 which will inherently convert the signals.

A polarity switch 39 is connected to converters 35, 36, 37 in order to permit for the head-out receiver processor to be coupled to the satellite receiver 41 via a single cable 40 and a joining means 38 which is a four (4) way splitter. The satellite receiver 41 is connected by way of line 42 to a source 43.

It is noted that FIG. 1 illustrates the use of two head-out receiver processors, but in actuality, only one head-out receiver processor is utilized with the head-in processor 44. The type and embodiment for the head-out receiver processor is dependent to the combination of the satellite receiver and source that are utilized.

The satellite system of the present invention will permit for two signals of different frequency and polarities to travel simultaneously via a single coaxial cable. The use of this will provide for a satellite system that is versatile, economical, and compact. The usage of the single cable permits for a system that can accept satellite broadcasting in places that were previously rendered impossible. These places includes mid/high-rise office buildings, condominiums, hospitals, schools, etc. The unique design and configuration enables the signals to be transmitted via the existing wiring of the buildings. The only renovations that may need to be done is the upgrading of the existing amplifiers.

While the invention has been particularly shown and described with reference to an embodiment thereof, it will be understood by those skilled in the art that various changes in form and detail may be made without departing from the spirit and scope of the invention.

I claim:

1. Satellite broadcast receiving equipment for receiving satellite broadcast signals of first and second polarizations, said receiving equipment in use providing received satellite broadcast signals to a plurality of satellite receivers which supply desired broadcasts to respective sources, the equipment comprising:
    a satellite dish structured to receive the satellite broadcast signals of first and second polarizations;
    a head-in processor for being coupled to the satellite dish, the head-in processor including a low-noise block converter and having an output for connection to a cable, said head-in processor supplying received satellite broadcast signals to the plurality of satellite receivers over the cable;
    said head-in processor including a converter configured to convert frequency-overlapping signals of first and/or second polarizations the satellite dish receives into non-interfering signals and in use apply said converted non-interfering signals simultaneously to the cable via the output, the processor enabling multiple different frequencies and polarizations to be supplied simultaneously to the plurality of satellite receivers via said cable;
    the plurality of satellite receivers each having a cable connection for in use being coupled to the cable, the plurality of satellite receivers each controlling selection of polarization on the cable to be provided thereto by sending a command via the cable connection thereof so the satellite receiver can obtain and provide desired broadcast signals to a source coupled to said satellite receiver.

2. The satellite broadcast receiving equipment as in claim 1 further including a power source for in use being coupled to said cable, said power source in use injecting power onto said cable.

3. The satellite broadcast receiving equipment as in claim 1 wherein said converter in use provides for said received satellite signals of different polarizations to be converted separately and independently to said satellite receivers.

4. The satellite broadcast receiving equipment as in claim 1 wherein said converter is structured to selectively convert said signals to each said satellite receiver via said cable.

5. The satellite broadcast receiving equipment as in claim 4 further including at least one polarity switch for in use being connected to switch between polarizations to be selectively converted to said satellite receivers.

6. The satellite broadcast receiving equipment as in claim 1 wherein said converter includes a first mixer structured to convert said signals of a first polarization to a desired first frequency range and second mixer structured to convert said signals of a second polarization to a desired second frequency range different from and not overlapping the first frequency range.

7. The satellite broadcast receiving equipment of claim 1 wherein said converter is structured to convert to avoid the forbidden conversion area.

8. A frequency translation method for implementation by satellite broadcast signal receiving equipment of the type that in use receives satellite broadcast signals in the form of frequency-overlapping signals from a satellite of first and second polarizations and supplies received satellite broadcast signals to a plurality of satellite receivers each of which supply selected broadcasts to a respective television, said frequency translation method comprising:
    low noise block frequency converting received broadcast signals of first and second polarizations into plural frequency-converted polarization blocks;
    converting the plural frequency-converted polarization blocks to be simultaneously conveying by a common cable to the plurality of satellite receivers such that said converted blocks don't overlap in frequency or otherwise interfere with one another on said cable; and
    enabling each of the plurality of satellite receivers to command selection of a polarization block conveyed on said cable to be supplied thereto so the satellite receivers can each thereby provide desired selected satellite broadcasts to associated televisions.

9. The method of claim 8 wherein said cable comprises a coaxial cable.

10. The method of claim 8 wherein said enabling includes switching independently for each of the plurality of receivers.

11. The method of claim 8 wherein at least one of said plural polarization blocks falls within 950 MHz to 1450 MHz.

12. The method of claim 11 wherein another of said plural polarization blocks occupies a frequency range that is lower than 950 MHz.

13. The method of claim 11 wherein another of said plural blocks occupies a frequency range that is higher than 1450 MHz.

14. The method of claim 8 wherein said low noise block frequency converting includes down frequency converting a block and said converting includes further converting the same block.

15. The method of claim 8 wherein said selection comprises further frequency converting.

16. The method of claim 8 wherein said converting avoids a forbidden conversion area.

17. The method of claim 8 further including inserting power onto said cable.

18. The method of claim 8 wherein said plural polarization blocks comprise transponders.

19. The method of claim 8 further including connecting the cable to a splitter.

20. A method for conveying received differently-polarized satellite broadcasts for selection by remote receiver equipment via a common cable, said method comprising:
    receiving, over the air with a satellite dish antenna, frequency-overlapping satellite broadcast signals having first and second polarizations;
    frequency down converting some of said received satellite broadcast signals and providing non-interfering signals;
    conveying the non-interfering signals of different polarizations over the common cable to a plurality of remote satellite receivers each coupled to said common cable; and
    enabling each of said remote satellite receivers to command polarization is to be supplied thereto so that different ones of said remote satellite receivers can cause selection of different polarizations such that a first remote satellite receiver can be selectively supplied with at least one transponder derived from first polarization and a second remote satellite receiver can simultaneously be selectively supplied with at least one transponder derived from the first or second polarization.

21. The method of claim 20 wherein said frequency down converting comprises low noise block conversion.

22. The method of claim 20 wherein said applying comprises diplexing.

23. The method of claim 20 further including avoiding a forbidden conversion area.

24. The method of claim 20 wherein said enabling comprises switching between polarizations at least in part in response to commands from said remote satellite receivers.

25. A method of receiving and distributing satellite signals comprising:
    receiving first and second satellite transponders over the air from at least one satellite;
    low noise block converting said received transponders;
    frequency converting said low noise block converted first transponder in a first direction;
    frequency converting said low noise block converted second transponder in a second direction different from said first direction;
    applying said frequency converted first and second transponders onto the same cable for conveyance to remote satellite receiving equipment; and
    switching between transponders for application to said remote receiver equipment in response to commands said remote satellite receiver equipment applies to said same cable.

26. The method of claim 25 wherein said first transponder has a first polarization and said second transponder has a second polarization different from said first polarization.

27. The method of claim 25 wherein said first transponder has a lefthand polarization and said second transponder has a righthand polarization.

28. The method of claim 25 wherein said first transponder has a vertical polarization and said second transponder has a horizontal polarization.

29. The method of claim 25 wherein said first direction is up.

30. The method of claim 25 wherein said first direction is down.

31. The method of claim 25 wherein said first direction is up followed by down.

32. A system for receiving and distributing satellite signals comprising:
    a satellite antenna that receives first and second satellite transponders of different polarizations over the air from at least one satellite;
    a low noise block converter that low noise block converts said received transponders;
    a frequency processor that frequency converts said low noise block converted first transponder in a first direction and frequency converts said low noise block converted second transponder in a second direction different from said first direction;
    a further element that applies said frequency converted first transponder and the second transponder onto the same cable for conveyance to remote satellite receiving equipment; and
    a switch that switches between transponders for application to said remote receiver equipment in response to a command said remote satellite receiver equipment applies to said same cable.

33. The system of claim 32 wherein said satellite antenna receives said first and second transponders at different polarizations.

34. The system of claim 32 wherein said further element comprises a splitter.

35. The system of claim 32 wherein said low noise block converter amplifies.

36. The system of claim 32 wherein said first direction comprises up and said second direction comprises down.

37. The system of claim 32 wherein said first direction comprises down and said second direction comprises up followed by down.

* * * * *

(12) INTER PARTES REEXAMINATION CERTIFICATE (1142nd)
United States Patent
Green, Sr. et al.

(10) Number: US 8,165,520 C1
(45) Certificate Issued: *Jul. 14, 2015

(54) SATELLITE BROADCAST RECEIVING AND DISTRIBUTION SYSTEM

(75) Inventors: James A. Green, Sr., Tallahassee, FL (US); Austin S. Coker, Jr., Tallahassee, FL (US)

(73) Assignee: GLOBAL COMMUNICATIONS, INC., Tallahassee, FL (US)

Reexamination Request:
No. 95/002,312, Sep. 14, 2012

Reexamination Certificate for:
Patent No.: 8,165,520
Issued: Apr. 24, 2012
Appl. No.: 12/464,969
Filed: May 13, 2009

( * ) Notice: This patent is subject to a terminal disclaimer.

Related U.S. Application Data

(63) Continuation of application No. 11/089,131, filed on Mar. 24, 2005, now Pat. No. 7,542,717, which is a continuation of application No. 10/016,119, filed on Dec. 17, 2001, now Pat. No. 6,917,783, which is a continuation of application No. 09/621,464, filed on Jul. 21, 2000, now Pat. No. 6,334,045, which is a continuation of application No. 09/001,484, filed on Dec. 31, 1997, now Pat. No. 6,122,482, which is a continuation of application No. 08/838,677, filed on Apr. 9, 1997, now Pat. No. 5,805,975, which is a continuation of application No. 08/394,234, filed on Feb. 22, 1995, now abandoned.

(51) Int. Cl.
*H04H 20/74* (2008.01)
*H04B 7/185* (2006.01)
*H04H 40/90* (2008.01)
*H04H 20/63* (2008.01)

(52) U.S. Cl.
CPC ............... *H04H 40/90* (2013.01); *H04H 20/63* (2013.01)

(58) Field of Classification Search
None
See application file for complete search history.

(56) References Cited

To view the complete listing of prior art documents cited during the proceeding for Reexamination Control Number 95/002,312, please refer to the USPTO's public Patent Application Information Retrieval (PAIR) system under the Display References tab.

*Primary Examiner* — Karin Reichle

(57) ABSTRACT

The present invention provides for a satellite system that will permit for the transmission of signals of two different frequencies and polarities to be transmitted simultaneously, also the system will accommodate two different polarity commands from two or more different sources at the same time. The satellite system of the present invention includes a satellite dish or antenna that receive signals. These received signals are then transmitted to a converter. A head-in frequency processor is coupled to the converter. This head-in frequency processor enables the different frequencies and polarities to be transmitted simultaneously via a single coaxial cable. This single coaxial cable is coupled to a head-out receiver processor which is connected to a receiver. This receiver is connected to a source. This unique design and configuration provides for the system that will permit for satellite broadcasting to occur in locations that are not in the line-of-sight path to the satellites. Accordingly, the satellite system of the present invention will permit satellite broadcasting in high-rises, hospitals, condominiums, schools, and the like.

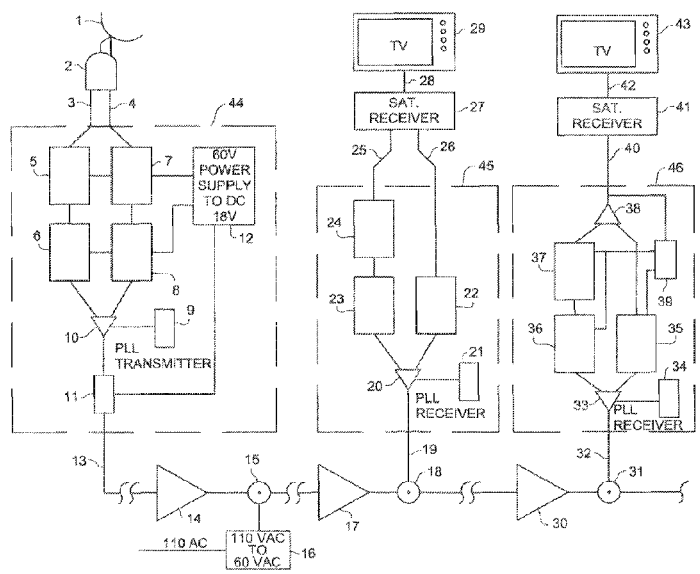

INTER PARTES REEXAMINATION CERTIFICATE

THE PATENT IS HEREBY AMENDED AS INDICATED BELOW.

AS A RESULT OF REEXAMINATION, IT HAS BEEN DETERMINED THAT:

The patentability of claims 25-37 is confirmed.

Claims 1-24 are cancelled.

\* \* \* \* \*